(12) United States Patent  
Kim

(10) Patent No.: US 10,796,050 B2  
(45) Date of Patent: Oct. 6, 2020

(54) METHOD FOR GENERATING AGING MODEL AND MANUFACTURING SEMICONDUCTOR CHIP USING THE SAME

(71) Applicant: SAMSUNG ELECTRONICS CO., LTD., Suwon-si, Gyeonggi-do (KR)

(72) Inventor: Moon Su Kim, Gimpo-si (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 0 days.

(21) Appl. No.: 16/416,762

(22) Filed: May 20, 2019

(65) Prior Publication Data

US 2020/0151294 A1   May 14, 2020

(30) Foreign Application Priority Data

Nov. 9, 2018 (KR) .......................... 10-2018-0137405

(51) Int. Cl.
| | |
|---|---|
| *G06F 30/367* | (2020.01) |
| *G06F 30/3312* | (2020.01) |
| *G01R 31/26* | (2020.01) |
| *G06F 30/36* | (2020.01) |
| *G06F 30/398* | (2020.01) |
| *G06F 119/04* | (2020.01) |
| *G06F 119/12* | (2020.01) |

(52) U.S. Cl.
CPC ..... *G06F 30/3312* (2020.01); *G01R 31/2642* (2013.01); *G06F 30/36* (2020.01); *G06F 30/367* (2020.01); *G06F 30/398* (2020.01); *G06F 2119/04* (2020.01); *G06F 2119/12* (2020.01)

(58) Field of Classification Search
USPC ....................................................... 716/113
See application file for complete search history.

(56) References Cited

U.S. PATENT DOCUMENTS

| | | | |
|---|---|---|---|
| 6,857,112 B1 | 2/2005 | Teig et al. | |
| 8,255,850 B2 | 8/2012 | Jain et al. | |
| 8,522,183 B1 * | 8/2013 | McGuinness | ....... G06F 30/3312 716/113 |
| 8,977,998 B1 | 3/2015 | Azizi et al. | |
| 9,147,032 B2 | 9/2015 | Ward | |
| 10,073,934 B1 * | 9/2018 | Keller | ................ G06F 30/3312 |

(Continued)

OTHER PUBLICATIONS

S. Bian, et al., "LSTA: Learning-Based Static Timing Analysis for High-Dimensional Correlated On-Chip Variations", Design Automation Conference (DAC), 2017 54th ACM/EDAC/IEEE.

(Continued)

*Primary Examiner* — Eric D Lee
(74) *Attorney, Agent, or Firm* — Lee IP Law, PC

(57) ABSTRACT

A method for generating an aging model used in the design of a semiconductor chip includes: extracting a plurality of aging scenarios including a use condition of the semiconductor chip from an aging model library of the semiconductor chip; calculating a first aging parameter commonly applied to a plurality of semiconductor elements included in the semiconductor chip from the plurality of aging scenarios; and generating characteristic deterioration information due to aging of each of the semiconductor elements through simulation using the first aging parameter and a second aging parameter of each of the semiconductor elements.

20 Claims, 11 Drawing Sheets

(56) References Cited

U.S. PATENT DOCUMENTS

2015/0154331 A1* 6/2015 Bansal .............. G01R 31/2881
                                                           716/113
2016/0371420 A1   12/2016 Brown
2017/0103236 A1*  4/2017 Homayoun, Jr. ....... G06F 21/87

OTHER PUBLICATIONS

X. Jiao, et al., "SLoT: A Supervised Lerning Model to Predict Dynamic Timing Errors of Functional Units", Design, Automation & Test in Europe Conference & Exhibition, 2017.

* cited by examiner

| Stress time | Simulation input | | Simulation output ΔVth | | | |
|---|---|---|---|---|---|---|
| | P(in1) | P(in2) | m1 | m2 | m3 | m4 |
| 1 | 0.1 | 0.1 | 0.05 | 0.05 | 0.40 | 0.01 |
| 1 | 0.1 | 0.5 | 0.05 | 0.20 | 0.35 | 0.02 |
| 1 | 0.1 | 0.9 | 0.05 | 0.38 | 0.30 | 0.03 |
| 1 | 0.5 | 0.1 | 0.20 | 0.05 | 0.35 | 0.02 |
| 1 | 0.5 | 0.5 | 0.20 | 0.20 | 0.27 | 0.10 |
| 1 | 0.5 | 0.9 | 0.20 | 0.38 | 0.20 | 0.18 |
| 1 | 0.9 | 0.1 | 0.38 | 0.05 | 0.30 | 0.03 |
| 1 | 0.9 | 0.5 | 0.38 | 0.20 | 0.20 | 0.18 |
| 1 | 0.9 | 0.9 | 0.38 | 0.38 | 0.10 | 0.27 |
| ... | | | | | | |
| 20 | 0.9 | 0.1 | 1.14 | 0.15 | 0.90 | 0.09 |
| 20 | 0.9 | 0.5 | 1.14 | 0.60 | 0.60 | 0.54 |
| 20 | 0.9 | 0.9 | 1.14 | 1.14 | 0.30 | 0.81 |

| Fmi | | | | Smi | | | | output |
|---|---|---|---|---|---|---|---|---|
| STeff | P0 | P1 | rise_fall | slew (V/μs) | load (μF) | Vop (V) | Top (°C) | Δdelay (μs) |
| 1 | 0.1 | 0.1 | r | 5 | 30 | 6 | 40 | 7 |
| 1 | 0.1 | 0.5 | r | 5 | 30 | 6 | 40 | 10 |
| 1 | 0.1 | 0.9 | r | 5 | 30 | 6 | 40 | 13 |
| 1 | 0.5 | 0.1 | r | 2 | 30 | 6 | 40 | 6 |
| 1 | 0.5 | 0.5 | r | 2 | 30 | 6 | 40 | 18 |
| 1 | 0.5 | 0.9 | r | 2 | 30 | 6 | 40 | 22 |
| 1 | 0.9 | 0.1 | r | 8 | 30 | 6 | 40 | 9 |
| 1 | 0.9 | 0.5 | r | 8 | 30 | 6 | 40 | 11 |
| 1 | 0.9 | 0.9 | r | 8 | 30 | 6 | 40 | 13 |
| ... | | | | | | | | |
| 20 | 0.9 | 0.1 | f | 8 | 30 | 6 | 40 | 30 |
| 20 | 0.9 | 0.5 | f | 8 | 30 | 6 | 40 | 35 |
| 20 | 0.9 | 0.9 | f | 8 | 30 | 6 | 40 | 38 |

METHOD FOR GENERATING AGING MODEL AND MANUFACTURING SEMICONDUCTOR CHIP USING THE SAME

CROSS-REFERENCE TO RELATED APPLICATION

Korean Patent Application No. 10-2018-0137405, filed on Nov. 9, 2018, in the Korean Intellectual Property Office, and entitled: "Method for Generating Aging Model and Manufacturing Semiconductor Chip Using the Same," is incorporated by reference herein in its entirety.

BACKGROUND

1. Field

Embodiments relate to a method for generating an aging model, and more particularly, to a method for generating an aging model of a semiconductor chip using minimum aging parameters, and a method for manufacturing a semiconductor chip using the same.

2. Description of the Related Art

Aging of a semiconductor chip is a phenomenon in which a performance of a semiconductor chip is deteriorated due to the occurrence of negative bias temperature instablility (NBTI), hot carrier injection (HCI), or the like, as the chip usage time increases.

Since a semiconductor chip is required to maintain a certain level of performance within a warranty period, aging characteristics are an essential consideration in chip design. Particularly, in an application in which uninterrupted operation is essential, such as in an electronic control unit (ECU) of a vehicle or a server device, aging characteristics become an important consideration in chip design.

By using an aging model of a semiconductor chip, a degree of aging of a semiconductor chip, for example, a threshold voltage variation, a timing delay, and the like, may be predicted. An aging model of a semiconductor chip requires a large number of aging parameters and the worst case scenario to increase prediction accuracy, so that modeling complexity and costs increase.

SUMMARY

According to an embodiments, a method for generating an aging model used in the design of a semiconductor chip may include: extracting a plurality of aging scenarios including a use condition of the semiconductor chip from an aging model library of the semiconductor chip; calculating a first aging parameter commonly applied to a plurality of semiconductor elements included in the semiconductor chip from the plurality of aging scenarios; and generating characteristic deterioration information due to aging of each of the semiconductor elements through simulation using the first aging parameter and a second aging parameter of each of the semiconductor elements.

According to an embodiment, a method for generating an aging model used in the design of a semiconductor chip may include: calculating a first aging parameter of the semiconductor chip from a plurality of use conditions defined in an aging model library of the semiconductor chip; generating characteristic deterioration information due to aging of each of the semiconductor elements using the first aging parameter and a second aging parameter of each of semiconductor elements included in the semiconductor chip; and generating timing information due to aging of the semiconductor chip using the characteristic deterioration information and a third aging parameter of each of the semiconductor elements.

According to an embodiment, a method for manufacturing a semiconductor chip may include: loading a plurality of aging scenarios from an aging model library of a semiconductor chip including a plurality of semiconductor elements; acquiring a global aging parameter commonly applied to the semiconductor elements from the plurality of aging scenarios; calculating one or more first timing delays of the semiconductor chip using the global aging parameter; calculating a second timing delay of the semiconductor chip by summing the first timing delays; determining whether the semiconductor chip violates timing constraints using the second timing delay; and manufacturing the semiconductor chip when the semiconductor chip does not violate the timing constraints.

BRIEF DESCRIPTION OF THE DRAWINGS

Features will become apparent to those of skill in the art by describing in detail exemplary embodiments with reference to the attached drawings in which:

FIG. 11 illustrates a table of exemplary values of input and output parameters of S800 in FIG. 9;

DETAILED DESCRIPTION

Figure 1:
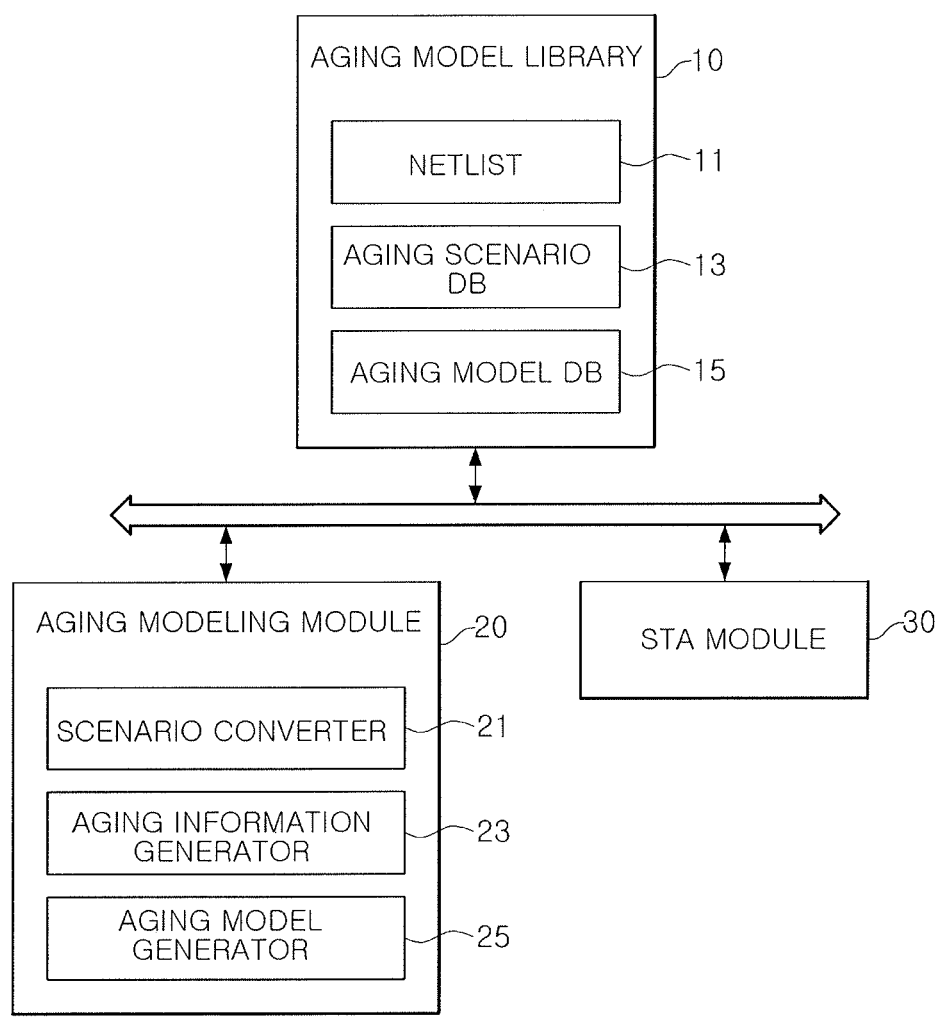
FIG. 1 illustrates an aging modeling system of a semiconductor chip according to example embodiments.

FIG. 1 illustrates an aging modeling system according to example embodiments. Referring to FIG. 1, an aging modeling system 10 may be a computer-based simulation system creating and updating an aging model of a semiconductor chip. For example, the aging modeling system 10 may simulate a degree of aging of a semiconductor chip using a plurality of aging parameters and may calculate an aging model of the corresponding semiconductor chip based on the corresponding simulation result. In an example embodiment, an aging modeling system 100 may include an aging model library 10, an aging modeling module 20, and a static timing analysis (STA) module 30.

The aging model library 10 may include a netlist 11, an aging scenario database (DB) 13, and an aging model database (DB) 15.

The netlist 11 is data defining a semiconductor chip and may include information on a type of a plurality of semiconductor elements included in the semiconductor chip, a connection relation of the semiconductor elements, and the like. In addition, the netlist 11 may include operating conditions of a semiconductor chip, e.g., an operating voltage Vop and an operating temperature Top, input and output signal information, and the like. The netlist 11 may be implemented as a form of a file with a preset format.

The aging scenario DB 13 may be a database in which various aging scenarios of a semiconductor chip are stored. Each of aging scenarios may include unique use conditions of a semiconductor chip and aging information associated therewith.

In an example embodiment, the use condition of a semiconductor chip may include bias information, usage time information, and the like, of a semiconductor chip. For example, the bias information of a semiconductor chip may include a bias voltage Vb, a bias temperature Tb, and the like, and the usage time information of a semiconductor chip may include a ratio of the usage time to the lifetime of the corresponding semiconductor chip (hereinafter referred to as "usage time duty ratio").

In addition, the aging information of a semiconductor chip may include characteristic deterioration information due to aging, timing information, and the like. For example, aging information of a semiconductor chip may include a threshold voltage variation, a timing delay variation, and the like.

As described above, the aging scenario DB 13 may be implemented in a file format in which various aging scenarios of a semiconductor chip are stored in various formats such as a table, a graph, a combination of both, or the like.

The aging model DB 15 may be a database in which a plurality of aging models of a semiconductor chip are stored. The aging models may be models for predicting a degree of aging of the corresponding semiconductor chip or each of semiconductor elements in the corresponding semiconductor chip, e.g., a threshold voltage variation or a timing delay, or the like, using predetermined aging parameters. In an example embodiment, the aging models may be implemented as a machine learning model. In this case, information on an input and output parameters of the corresponding machine learning model may be stored in the aging model DB 15.

Respective components 11 to 15 of the aging model library 10 may be distributed to a nonvolatile memory device, a storage, or the like, to form a single logical entity. For example, the netlist 11 may be implemented in a NAND flash memory, while the aging scenario DB 13 and the aging model DB 15 may be implemented in the storage.

The STA module 30 may be implemented in a level of software (that is, a programming code) for performing static timing analysis of a semiconductor chip or hardware using VHDL (VHISC (Very High Speed Integrated Circuit) Hardware Description Language), or the like.

The STA module 30 may perform a simulation function for generating aging information using various aging parameters of a semiconductor chip. In addition, the STA module 30 may perform a function for simulating and verifying a timing delay of a semiconductor chip or each of semiconductor elements in the corresponding semiconductor chip using a liberty variation format (LVF) standard library including a timing delay and a change model of a semiconductor chip.

The aging modeling module 20 may calculate a degree of aging of a semiconductor chip, generated by various aging scenarios, and may generate an aging model of the corresponding semiconductor chip based on the calculated result.

In order to perform the functions described above, the aging modeling module 20 may include a scenario converter 21, an aging information calculator 23, and an aging model generator 25. The specific contents of respective components will be described with reference to FIG. 2.

Figure 2:
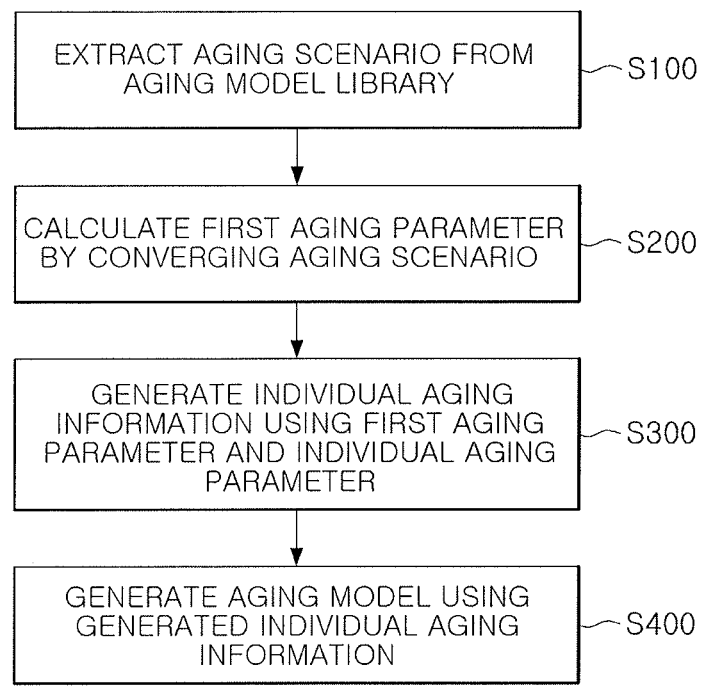
FIG. 2 illustrates a flow diagram of a method for generating an aging model of a semiconductor chip according to an example embodiment.

FIG. 2 is a flow diagram illustrating a method for generating an aging model of a semiconductor chip according to an example embodiment.

Referring to FIGS. 1 and 2, in S100, the scenario converter 21 may extract a plurality of aging scenarios to be applied to a semiconductor chip from the aging model library 10. For example, the scenario converter 21 may load various combinations of aging scenarios from the aging scenario DB 13.

In S200, the scenario converter 21 may converge the plurality of aging scenarios, extracted in S100, to calculate a first aging parameter of a semiconductor chip. The first aging parameter may be a representative parameter having a common effect on aging of all semiconductor elements in a semiconductor chip. For example, the first aging parameter may be provided as a global aging parameter.

In an example embodiment, the first aging parameter may include effective stress time ST_eff commonly applied to all semiconductor elements in a semiconductor chip. The effective stress time may be the time that actually affects aging of the corresponding semiconductor chip within the usage time of a semiconductor chip.

In S300, the aging information calculator 23 may generate individual aging information of each of the corresponding semiconductor elements based on a simulation result using the first aging parameter of the semiconductor chip calculated in S200 and a second aging parameter of the semiconductor chip. For example, the aging information calculator 23 provides the first aging parameter, received from the scenario converter 21, and the second aging parameter of each of the semiconductor elements to the STA module 30 to perform simulation, and may generate individual aging information of each of the semiconductor elements using the corresponding simulation result.

The second aging parameter may be an individual aging parameter affecting aging of each of the semiconductor elements. The second aging parameter may be provided as an instant aging parameter. In an example embodiment, the second aging parameter may include a probability in which each of semiconductor elements in the corresponding semiconductor chip is under stress conditions during use of the semiconductor chip. The STA module 30 may include a software tool predicting aging characteristics of a circuit, e.g., an open source tool such as a simulation program with integrated circuit emphasis (SPICE), a commercially available tool such as Proteus Design Suite by Labcenter Electronics, Ltd., and the like. The individual aging information is characteristic deterioration information due to aging of each of the semiconductor elements and may include, e.g., a threshold voltage variation $\Delta Vth$ of a transistor element, and the like.

In S400, the aging model generator 25 may generate an individual aging model predicting a degree of aging of each of the semiconductor elements based on the individual aging information calculated in S300. For example, the aging model generator 25 may generate an individual aging model of each of semiconductor elements based on correlation among the first and second aging parameters, and the individual aging information. The individual aging model, generated in S400, is stored in the aging model DB 15, and may be used for static timing analysis of the corresponding semiconductor chip.

In an example embodiment, the aging model generator 25 may train a machine learning model using the individual aging parameter of each of semiconductor elements and individual aging information upon the individual aging parameter as training data, and may set the trained machine learning model as an individual aging model. For example, the aging model generator 25 may set the first aging parameter received from the scenario converter 21, and the second aging parameter of each of semiconductor elements as input data, train a machine learning model using individual aging information of each of semiconductor elements, calculated by the aging information calculator 23 as an output label to correspond to the corresponding input data, and set the trained machine learning model as an individual aging model predicting a degree of individual aging of each of semiconductor elements.

The machine learning model, to be applied to an example embodiment, may include a network generating desired output data by combining extracted feature vectors after extracting the feature vectors from predetermined input data, for example, an artificial neural network (ANN), a recurrent neural network (RNN), a regression support vector machine (SVM), or the like.

Figure 3:
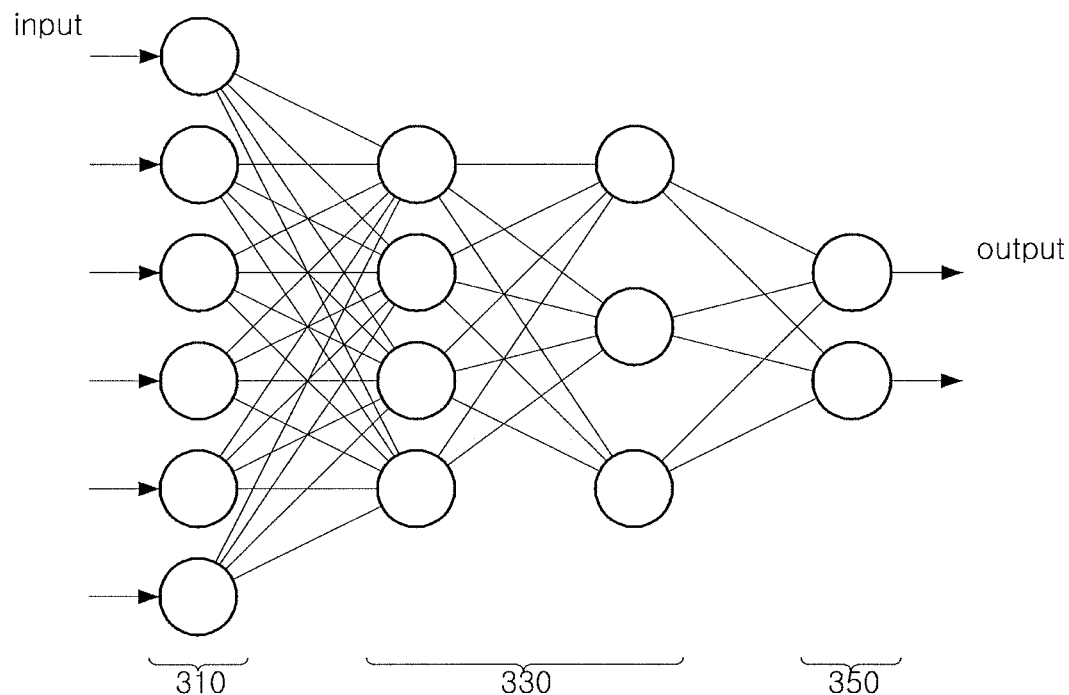
FIG. 3 illustrates a structure of a machine learning model used to generate an aging model according to example embodiments by way of example.

FIG. 3 illustrates an example of an artificial neural network to be applied to a method for generating an aging model of a semiconductor chip according to an example embodiment. Referring to FIG. 3, an artificial neural network 300 may include an input layer 310, a plurality of hidden layers 330, and an output layer 350. When one or more aging parameters of a semiconductor chip are input through the input layer 310, feature points are extracted through the plurality of hidden layers 330, and at least one piece of aging information of the corresponding semiconductor chip is output through the output layer 350 from the corresponding feature points.

The method for generating an aging model of a semiconductor chip according to example embodiments described above calculates a single representative parameter from a plurality of aging scenarios of a semiconductor chip, and generates an aging model using the calculated representative parameter, thereby having an effect of reducing the complexity of the aging modeling.

Figure 4:
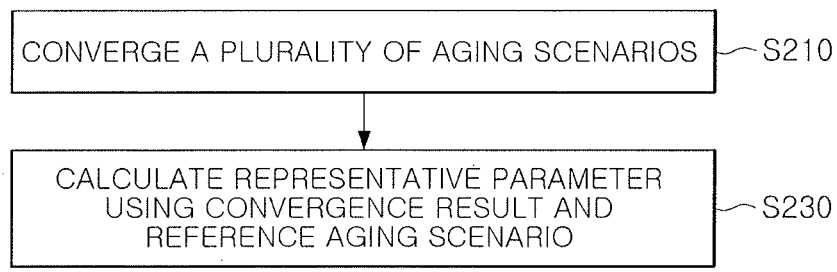
FIG. 4 illustrates a flow diagram a detailed operation of S200 in FIG. 2.

Hereinafter, referring to FIGS. 4 to 5B, contents of a detailed operation of S200 in FIG. 2 will be described in further detail. FIG. 4 is a flow diagram illustrating a detailed operation of S200 in FIG. 2, and FIGS. 5A and 5B are exemplary views illustrating a detailed operation of S200 in FIG. 2.

First, referring to FIG. 4, the calculating a representative parameter, e.g., the effective stress time (ST_eff), from a plurality of aging scenarios of a semiconductor chip S200, may include converging a plurality of aging scenarios S210, and calculating a representative parameter using the convergence result and a reference aging scenario S230.

In an example embodiment, in S210, the scenario converter 21 may converge a plurality of aging scenarios to generate aging information of a semiconductor chip under a specific use condition. The specific use condition may include bias information and usage time information, of a semiconductor chip. In addition, the specific use condition may be set in advance in consideration of aging properties of a semiconductor chip (e.g., a size of a process variation, or the like) or a requirement for a device, in which a semiconductor chip is used (e.g., request for seamless service, or the like). For example, the specific use condition may be set in advance to one of a worst case in which an aging speed of the corresponding semiconductor chip is fastest, an average case in which the aging speed is an average speed, and a best case in which the aging speed is slowest.

Figure 5A:
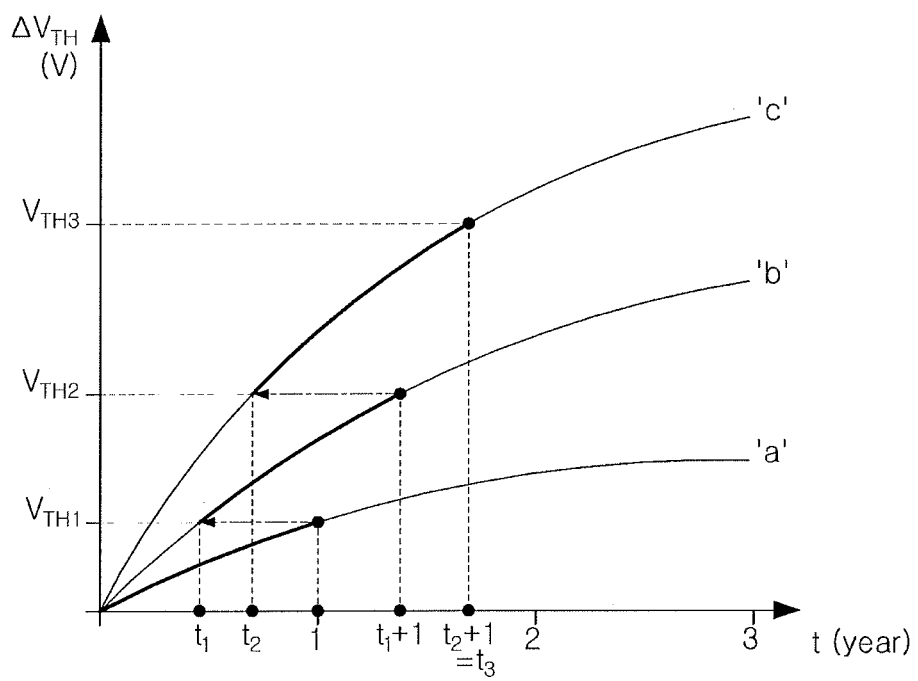
FIGS. 5A and 5B illustrate exemplary views of a detailed operation of S200 in FIG. 2.

FIG. 5A illustrates a specific example of S210. In FIG. 5A, a curve 'a' to a curve 'c' are aging curves illustrating a threshold voltage variation according to the usage time of a semiconductor chip. In FIG. 5A, the curve 'a' to the curve 'c' correspond to respective aging scenarios of a semiconductor chip. For example, the curve 'a' corresponds to a best case in which a degree of aging of a semiconductor chip is slowest, the curve 'b' corresponds to an average case in which a degree of aging of a semiconductor chip is average, and the curve 'c' corresponds to a worst case in which a degree of aging of a semiconductor chip is fastest.

In the example of FIG. 5A, the curve 'a' is an aging curve under [1 V, 100° C.] bias condition, the curve 'b' is an aging curve under [2 V, 80° C.] bias condition, and the curve 'c' is an aging curve under [3 V, 120° C.] bias condition. In FIG. 5A, the semiconductor chip is used under a [1 V, 100° C.] bias condition for the first one year period, under a [2 V, 80° C.] bias condition for the following one year period, and under a [3 V, 120° C.] bias condition for the final one year period, assuming that the semiconductor chip is used for a total of three years.

Referring to FIG. 5A, under a first bias condition of [1 V, 100° C.] for the first one year period, a threshold voltage cumulative variation of a semiconductor chip is 'Vth1'. Under a second bias condition of [2 V, 80° C.] for the following one year period, a threshold voltage cumulative variation of a semiconductor chip is 'Vth2'. Under a third bias condition of [3 V, 120° C.] for the final one year period, a threshold voltage cumulative variation of a semiconductor chip is 'Vth3'. In this case, when the total usage time of the corresponding semiconductor chip, i.e., three years, is converted to the case of a bias condition of [3 V, 120° C.], the usage time is 't3' (here, t3<3 year).

As a result, the total of three aging scenarios, in which a semiconductor chip is used for a year under a first bias condition, for a year under a second bias condition, and for a year under a third bias condition, may be converged to a single aging scenario in which a semiconductor chip is used for a 't3' time under a third bias condition. In this case, a threshold voltage variation (aging information) of the corresponding semiconductor chip may be 'Vth3'.

Again, referring to FIG. 4, in S230, the scenario converter 21 may calculate a representative parameter by projecting aging information of a semiconductor chip into a preset reference aging scenario under a specific use condition calculated in S210. For example, the representative parameter, e.g., effective stress time (ST_eff), is a global aging parameter to be commonly applied to aging modeling of all semiconductor elements of a semiconductor chip.

The reference aging scenario may include aging information under a reference use condition and the corresponding condition. The reference aging scenario is preset to a value statistically obtained through repeated simulations and may be stored in the aging scenario DB 13.

Figure 5B:
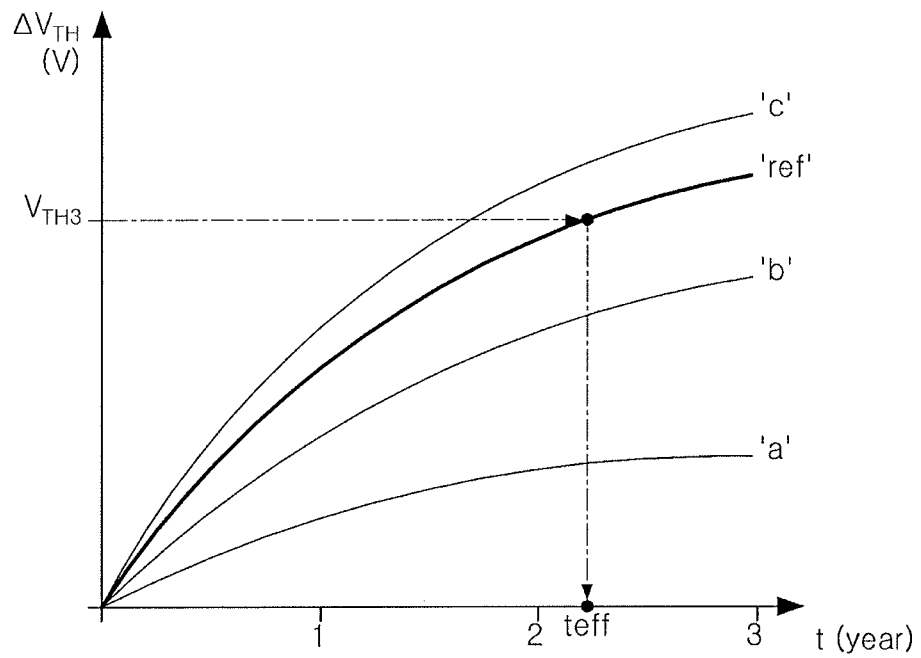

FIG. 5B illustrates a specific example of S230. In FIG. 5B, a curve 'a' to a curve 'c' are aging curves as described with reference to FIG. 5A, and a curve 'ref' may be an aging curve corresponding to a reference aging scenario. In an example of FIG. 5B, a curve 'ref' may be a reference aging curve in which a degree of aging is statistically calculated in the case in which a semiconductor chip is used for a total of three years under a reference bias condition of [2.5 V, 100° C.].

Referring to FIG. 5B, when a threshold voltage variation 'Vth3' of a semiconductor chip, determined in FIG. 5A, is projected onto a curve 'ref', the usage time of the corresponding semiconductor chip in the reference aging scenario is a 'teff' (here, teff<3 year). Here, a 'teff' is the time actually affecting aging of the corresponding semiconductor chip, among the total three years in which the corresponding semiconductor chip is used with three aging scenarios, i.e., the effective stress time ST_ref.

Figure 6:
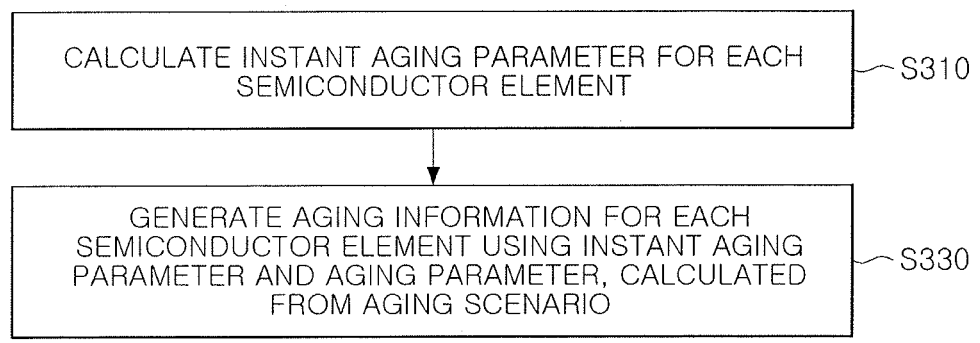
FIG. 6 illustrates a flow diagram of a detailed operation of S300 in FIG. 2.
Figures 7, 8:
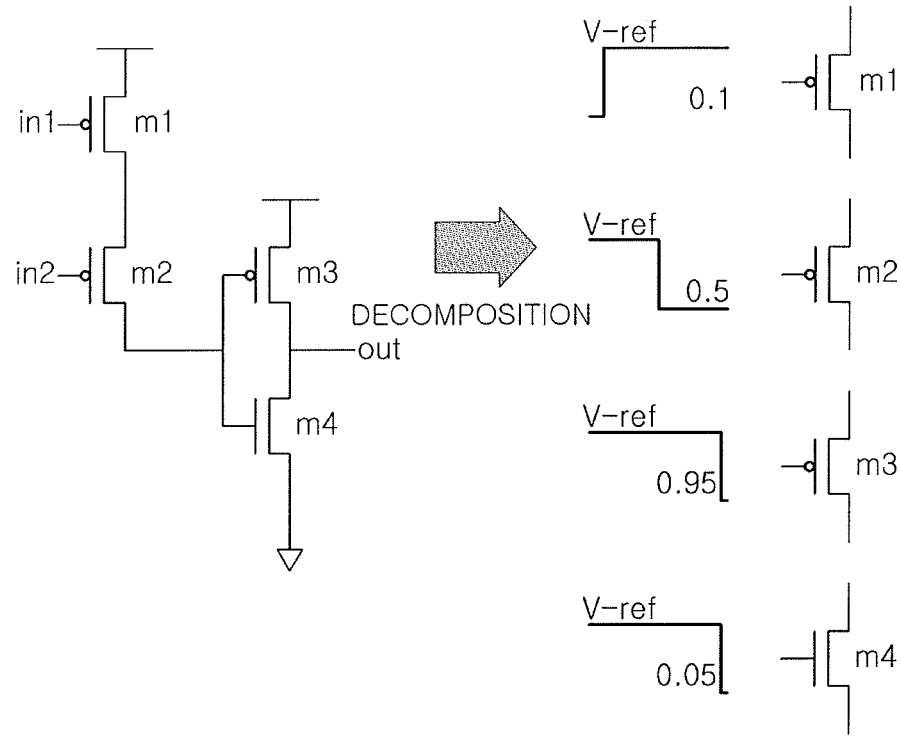
FIG. 7 illustrates an exemplary circuit diagram of a detailed operation of S300 in FIG. 2.
FIG. 8 illustrates a table of exemplary values of input and output parameters of S300 in FIG. 2.

Next, referring to FIGS. 6 to 8, contents of a detailed operation of S300 in FIG. 2 will be described in further detail. FIG. 6 is a flow diagram illustrating a detailed operation of S300 in FIG. 2, FIG. 7 is a circuit diagram for explaining a specific example of FIG. 6, and FIG. 8 is a table illustrating input and output parameters values according to an example of FIG. 6.

First, referring to FIG. 6, generating individual aging information using a representative parameter of a semiconductor chip and an instant aging parameter of each configuration element S300 may include calculating an instant aging parameter S310. Generating individual aging information for each semiconductor element using the calculated instant aging parameter and the representative parameter of a semiconductor chip S330.

An example embodiment, in S310, the aging information calculator 23 may calculate an individual aging parameter of each of semiconductor elements in a semiconductor chip, i.e., an instant aging parameter. In an example embodiment, the instant aging parameter may include a probability in which each semiconductor element is under stress conditions during use of a semiconductor chip, i.e., an individual turn-on probability.

As a degree of aging of a semiconductor chip increases, characteristics of each of a plurality of semiconductor elements included in the corresponding semiconductor chip may be degraded. For example, in a semiconductor element, e.g., a field effect transistor (FET), deterioration of negative bias temperature instablility (NBTI) or hot carrier injection (HCI) increases due to aging, so that a change in a threshold voltage may occur. In this case, a degree to which a threshold voltage of each semiconductor element is changed may vary depending to the operating time of each element. Thus, in a method for generating an aging model according to example embodiments, a probability in which each of semiconductor elements is under stress conditions during use of a semiconductor chip is used to generate aging information of each of the corresponding semiconductor elements.

In S330, the aging information calculator 23 performs a simulation using an instant aging parameter of each of semiconductor elements, calculated in S310, and a global aging parameter, commonly applied to the corresponding semiconductor elements, e.g., the effective stress time ST_eff, thereby generating individual aging information of each of the corresponding semiconductor elements. The individual aging information may include characteristic deterioration information due to aging of each of semiconductor elements, e.g., a threshold voltage variation of a transistor element, and may be calculated as a simulation result by the STA module 30.

Each operation of FIG. 6 will be described in further detail using an exemplary circuit diagram of FIG. 7. FIG. 7 illustrates an example of a semiconductor chip 700 including four transistors, i.e., first to fourth transistors m1 to m4.

Referring to FIG. 7, the semiconductor chip 700 has two input terminals in1 and in2, and a single output terminal out. The semiconductor chip 700 may include a first transistor m1 and a second transistor m2, mutually connected in series, and connected to the input terminals in1 and in2, respectively, as well as a third transistor m3 and a fourth transistor m4, connected in parallel to a drain terminal n of the second transistor m2, e.g., having gate electrodes connected thereto. Here, the first to third transistors m1 to m3 are PMOS transistors, while the fourth transistor m4 is an NMOS transistor.

When an input is 'low', the first to third transistors m1 to m3 are turned-on. When an input is 'high', the fourth transistor m4 is turned-on. Thus, the probability in which each of the transistors m1 to m4 are turned-on may be calculated as a probability in which an input of each transistor has a specific value. The probability P1, in which the first transistor m1 is turned-on, is 'P(in1='low')', while the probability P2, in which the second transistor m2 is turned-on, is 'P(in2='low')'. Moreover, the probability P3, in which the third transistor m3 is turned-on, is '1−P1×P2', while the probability P4, in which the fourth transistor m4 is turned-on, is 'P1×P2'.

According to an example embodiment, the aging information calculator 23 performs simulation using the effective aging time ST_eff of the corresponding semiconductor chip 700 and the probabilities P1 to P4, in which respective transistors m1 to m4 are turned-on, under a reference bias condition, after the semiconductor chip 700 is decomposed into the respective transistors m1 to m4, thereby calculating a degree of characteristic deterioration due to aging of each of transistors m1 to m4, e.g., threshold voltage variations ΔVth,m1 to ΔVth,m4. As described above, when each of semiconductor elements is decomposed and simulation is performed, parasitic resistance and parasitic capacitance components may be ignored. In this case, a file size of a netlist is reduced, so that simulation costs are reduced.

In an example of FIG. 7, input and output parameters values for generating aging information may be the same as those illustrated in FIG. 8. FIG. 7 illustrates a particular example in the table of FIG. 8, i.e., where P1 is 0.1 and P2 is 0.5. Referring to FIG. 8, as may be seen from the table therein, when a probability in which each transistor m1 to m4 is turn-on increases, a degree of characteristic deterioration due to aging of each transistor m1 to m4, i.e., a threshold voltage variation ΔVth, increases. In addition, when the effective stress time ST_eff is increases, a degree of characteristic deterioration due to aging of each transistor m1 to m4 increases.

An aging model of a semiconductor chip generated based on input parameters and aging information, calculated through the process described above, may be expressed as Equation 1.

$$\Delta Vth_{mi} = F_{mi}(ST\_eff, P_0, P_1, \ldots, P_n) \quad [\text{Equation 1}]$$

Here, $\Delta Vth_{mi}$ refers to a threshold voltage variation for each semiconductor element in a semiconductor chip, $F_{mi}()$ is an aging model for each semiconductor element in the semiconductor determined through machine learning, ST_eff refers to the effective stress time to be applied to all semiconductor elements, and $P_0$ to $P_n$ refer to probability values for calculating an operation probability of each of semiconductor elements, i.e., $F_{mi}(\ )$ uses ST_eff and $P_i$ to determine each $\Delta Vth_{mi}$.

Figure 9:
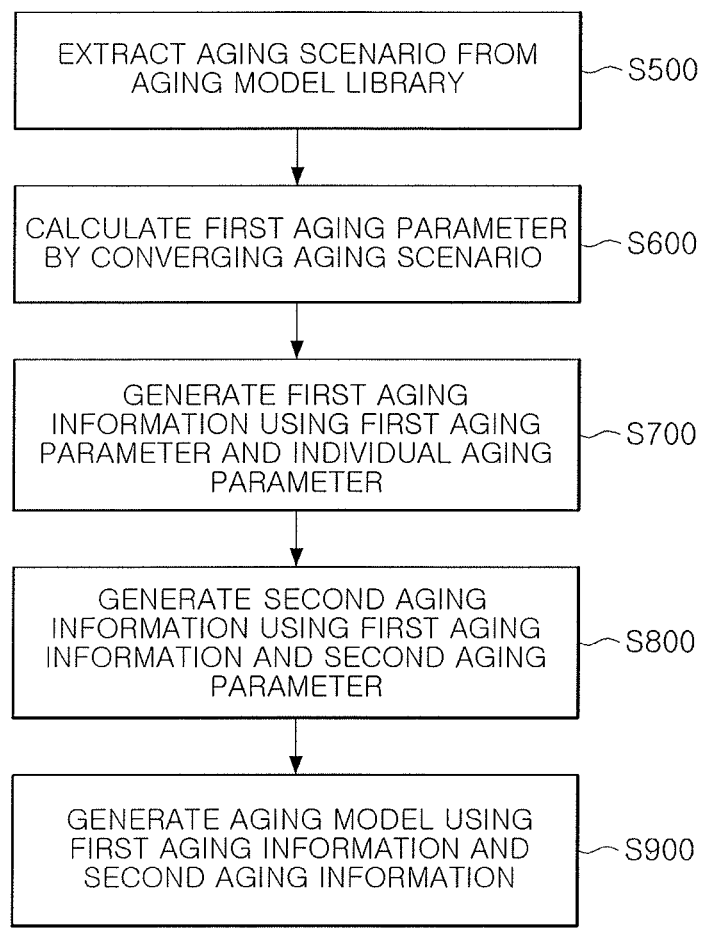
FIG. 9 illustrates a flow diagram of a method for generating an aging model of a semiconductor chip according to an example embodiment.

FIG. 9 is a flow diagram illustrating a method for generating an aging model of a semiconductor chip according to another example embodiment. In the method for generating an aging model of FIG. 9, a plurality of pieces of aging information may be used to generate an aging model of a semiconductor chip. Meanwhile, to describe the method for generating an aging model of FIG. 9, the description of the contents overlapping with the example embodiment described with reference to FIG. 2 will be omitted or briefly described.

Referring to FIGS. 1 and 9, in S500, the scenario converter 21 may extract a plurality of aging scenarios of a semiconductor chip from the aging model library 10.

In S600, the scenario converter 21 may converge the plurality of aging scenarios, extracted in S500, to calculate a first aging parameter of a semiconductor chip.

The first aging parameter may be a representative parameter having a common effect on all semiconductor elements in a semiconductor chip and may be provided as a global aging parameter. In an example embodiment, the first aging parameter may include effective stress time ST_eff of a semiconductor chip.

In S700, the aging information calculator 23 may generate first aging information, based on a simulation result using the first aging parameter of the semiconductor chip calculated in S600, and a second aging parameter of the semiconductor chip.

The second aging parameter may be an individual aging parameter having an affect on aging of each of semiconductor elements and may be provided as an instant aging parameter. In an example embodiment, the second aging parameter may include a probability in which each of semiconductor elements in the corresponding semiconductor chip is under stress conditions during use of the semiconductor chip. The first aging information is characteristic deterioration information due to aging of each of the semiconductor elements and may include, e.g., a threshold voltage variation $\Delta Vth$ of a transistor element.

In S800, the aging information calculator 23 may generate second aging information, based on a simulation result using the first aging parameter calculated in S700, and a third aging parameter of the semiconductor chip.

The third aging parameter may be an instant aging parameter of each of the semiconductor elements. For example, the third aging parameter may include load capacitance ('Load cap' in FIG. 10A) of each of semiconductor elements, information ('rise' or 'fall', 'fall' in FIG. 10B) illustrating a direction of change of an output voltage (or, a current), and slew information ('slew' in FIG. 10B) of an output voltage (or, a current). In addition, a third aging parameter may further include operating conditions of each of semiconductor elements, e.g., an operating voltage Vop and an operating temperature Top.

The third aging parameter may include timing delay sensitivity of each of the semiconductor elements. The timing delay sensitivity refers to a timing delay variation of a semiconductor chip to a threshold voltage variation of each of semiconductor elements and may be expressed as Equation 2.

$$S_{mi}(\text{rise\_fall, slew, load, }V_{op}, T_{op}) = \frac{dDelay}{d\sigma Vth, mi} \quad \text{[Equation 2]}$$

Here, '$S_{mi}$' refers to timing delay sensitivity of each semiconductor element. 'rise_fall' refers to output transition direction information (i.e., rise or fall) of each semiconductor element, 'slew' refers to output transition slew information of each semiconductor element (FIG. 10B), 'load' refers to an output load value (e.g., output capacitance) of each semiconductor element (FIG. 10A), and '$V_{op}$' and '$T_{op}$' respectively refer to an operating voltage and an operating temperature of each semiconductor element. 'dDelay' refers to a timing delay variation of a semiconductor chip, and 'd$\sigma$Vth.mi' refers to a variation of a deviation ($\sigma$) of a threshold voltage Vth of each semiconductor element.

The deviation ($\sigma$) of the threshold voltage Vth refers to a process deviation which may vary depending on a manufacturing process of a semiconductor element and may be provided from a manufacturer with a mean value of a threshold voltage Vth.

The timing delay sensitivity of each of semiconductor elements may be generated as an intermediate value of a characterization process of a liberty variation format (LVF) of a semiconductor chip characterization.

In a process of generating second aging information S800, a detailed example of parameter values is illustrated in FIG. 11. Referring to FIG. 11, a global aging parameter ST_eff, and instant aging parameters such as $P_0$, $P_1$, and the like may be input parameters of an aging model, while a timing delay variation $\Delta$delay may be an output parameter of the corresponding aging model. In an example embodiment, the input parameters and the output parameter, described above, may be used as training data of a machine learning model, and the trained machine learning model may be set to an aging model of a semiconductor chip.

In S900, the aging model generator 25 may generate an aging model of a semiconductor chip based on the second aging information (S800). For example, the aging model generator 25 may generate a global aging model for predicting a degree of aging of a semiconductor chip, based on correlation among the effective stress time ST_eff, individual aging parameters (instant parameters) of each semiconductor element, and second aging information (i.e., timing information of a semiconductor chip).

The individual aging parameters may include individual turn-on probabilities $P_0$ to $P_n$ of each of semiconductor elements, output slew information, a load value, an operating voltage, and an operating temperature. In this case, the generated individual aging model is stored in the aging model DB 15 and may be used for static timing analysis of the corresponding semiconductor chip. The aging model of a semiconductor chip, generated in S900, may be expressed as Equation 3.

$$\Delta Timing_k = G_k(\text{slew,load},V_{op},T_{op},ST\_\text{eff},P_0, P_1, \ldots, P_n) \quad \text{[Equation 3]}$$

Here, '$\Delta Timing_k$' refers to timing information of a semiconductor chip, while '$G_k(\ )$' refers to an aging model of the corresponding semiconductor chip. 'slew' refers to output transition slew information of each semiconductor element, 'load' refers to an output load value (e.g., output capacitance) of each semiconductor element, and '$V_{op}$' and '$T_{op}$' respectively refer to an operating voltage and an operating temperature of each semiconductor element. 'ST_eff' refers to an aging parameter to be commonly applied to all semiconductor elements in a semiconductor chip, that is, a representative parameter, while $P_0$ to $P_n$ refer to probabilities in which each semiconductor element is under stress conditions during use of a semiconductor chip.

Figure 10A:
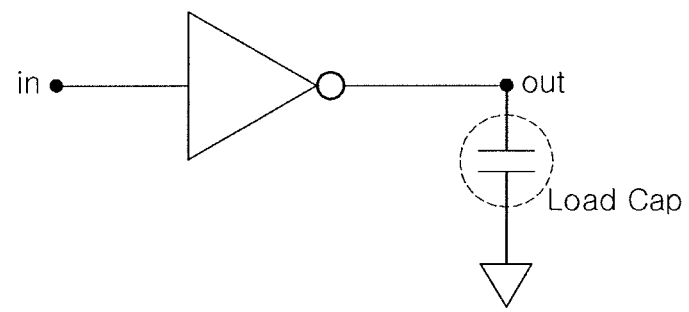
FIGS. 10A and 10B illustrate exemplary views of a detailed operation of S800 in FIG. 9.
Figure 10B:
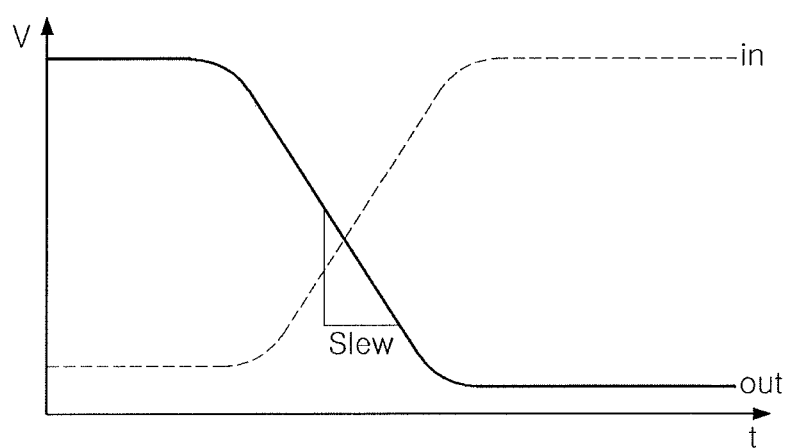

The timing information of a semiconductor chip, as a timing impact generated due to aging of a semiconductor chip, may include timing delay, transition information, and the like. FIGS. 10A to 11, described above, illustrate when information of a semiconductor chip, e.g., a timing delay, is predicted, and an aging model $G_k(\ )$ of Equation 3 of the corresponding semiconductor chip may be expressed as Equation 4.

$$\Delta delay = \sum_{i=1}^{\# \text{ of transitors}} F_{mi}(ST_{\text{eff}}, P_0, P_1, \ldots, P_n) \times \quad \text{[Equation 4]}$$

$$S_{mi}(\text{rise\_fall, slew, load, } V_{op}, T_{op}),$$

where $S_{mi}(\text{rise\_fall, slew, load, } V_{op}, T_{op}) = \dfrac{dDelay}{doVth, mi}$ Here, $\Delta$delay refers to a timing delay variation, aging information of a semiconductor chip, $F_{mi}(\ )$ refers to an aging model of each of semiconductor elements of Equation 1 (having the effective aging time ($ST_{\text{eff}}$) and individual turn-on probability ($P_i$) as inputs, and an output is an individual threshold voltage variation), and $S_{mi}(\ )$ refers to timing delay sensitivity of each of semiconductor elements of Equation 2.

Referring to Equation 4, a timing delay variation of a semiconductor chip may be calculated by summing timing delay variations (i.e., $F_{mi}(\ ) \times S_{mi}(\ )$) of respective semiconductor elements in the corresponding semiconductor chip.

As described above, the method for generating an aging model according to an example embodiment may reduce modeling costs and complexity by generating aging information using timing delay sensitivity and an intermediate value of an LVF characterization process, rather than using a plurality of aging parameters themselves.

Figure 12:
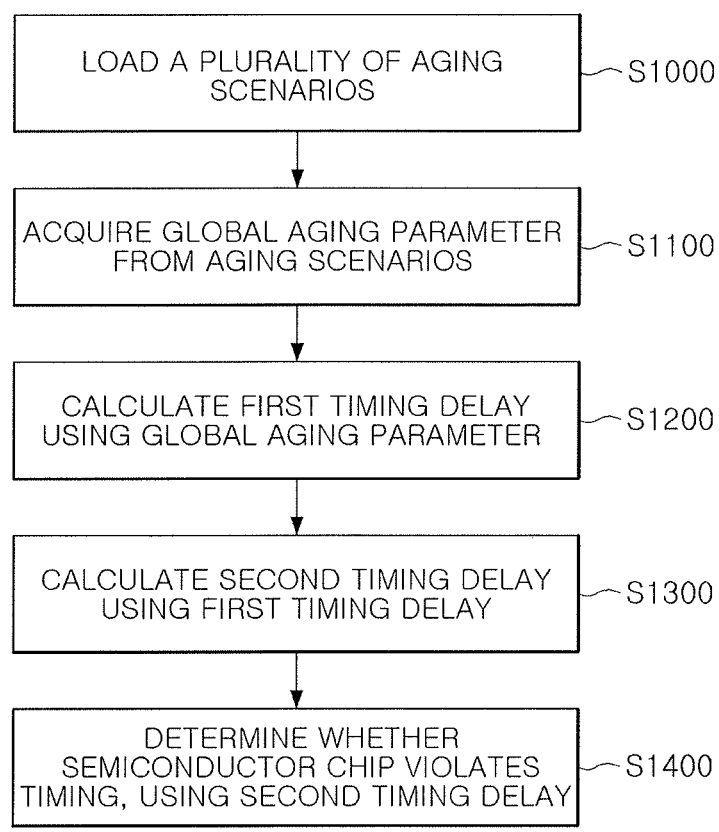
FIG. 12 illustrates a flow diagram of a static timing analysis method of a semiconductor chip according to an example embodiment.

FIG. 12 is a flow diagram illustrating a static timing analysis method of a semiconductor chip according to an example embodiment.

Referring to FIGS. 1 and 12, in S1000, the scenario converter 21 may load a plurality of aging scenarios from the aging model library 10. The aging model library 10 may be logical entity, including a netlist 11 in which a type of semiconductor elements included in a semiconductor chip and their connection relationship are defined, aging scenario DB 13 in which a use condition of the corresponding semiconductor chip and aging information according to the use condition are defined as a graph or table format, and at least one aging model DB 15 of the corresponding semiconductor chip.

In S1100, the scenario converter 21 may obtain a global aging parameter to be commonly applied to a plurality of semiconductor elements from a plurality of aging scenarios loaded in S1000, that is, a representative parameter. For example, the scenario converter 21 calculates a total degree of aging of a semiconductor chip by a plurality of aging scenarios, e.g., a threshold voltage variation, and projects the total degree of aging into a reference aging scenario, thereby obtaining the time actually affected by aging, among the total usage time of the corresponding semiconductor chip, i.e., the effective stress time, as a representative parameter.

In S1200, the aging information calculator 23 may calculate a first timing delay (local timing delay) using the global aging parameter, calculated in S1100, and instant aging parameters of each of semiconductor elements. The first timing delay may be a value of a standard cell level including one or more semiconductor elements or may be a value to be applied to each semiconductor element. For example, the aging information calculator 21 calculates a threshold voltage variation of each of the corresponding semiconductor elements using the effective stress time ST_eff and probabilities in which each of semiconductor elements is under stress conditions $P_0$ to $P_n$ during use of a semiconductor chip, and calculates a first timing delay by multiplying the corresponding threshold voltage variation and timing delay sensitivity of each of the corresponding semiconductor elements. In this case, the calculated first timing delay may be expressed as Equation 5.

$$\Delta delay, mi = \Delta Vth, mi \times S, mi \quad \text{[Equation 5]}$$

Here, '$\Delta$delay,mi' refers to a first timing delay, '$\Delta$Vth,mi" refers to a threshold voltage variation of each of semiconductor elements calculated using Equation 1, and 'S,mi' refers to timing delay sensitivity of each of semiconductor elements calculated using Equation 2. A method for calculating a threshold voltage variation $\Delta$Vth,mi of each of semiconductor elements is as described above with reference to FIGS. 2 and 9.

In S1300, the aging information calculator 23 may calculate a second timing delay $\Delta$delay by summing the first timing delay $\Delta$delay,mi, calculated in S1200. In this case, the calculated second timing delay may be expressed as Equation 6.

$$\Delta delay = \Sigma_{i=1}^{\# \text{ of devices}} \Delta delay, mi \quad \text{[Equation 6]}$$

Here, '$\Delta$delay' refers to a second timing delay, while '$\Delta$delay,mi' refers to a first timing delay calculated using Equation 5.

In S1400, the STA module 30 receives a first timing delay $\Delta$delay,mi, calculated in S1200, and a second timing delay $\Delta$delay, calculated in S1300, and performs static timing analysis (STA) using input information to determine whether a semiconductor chip violates timing constraints, e.g., if the delay exceeds a predetermined threshold. When a design of a semiconductor chip does not violate timing constraints, a semiconductor chip may be manufactured in accordance with the design.

Figure 13:
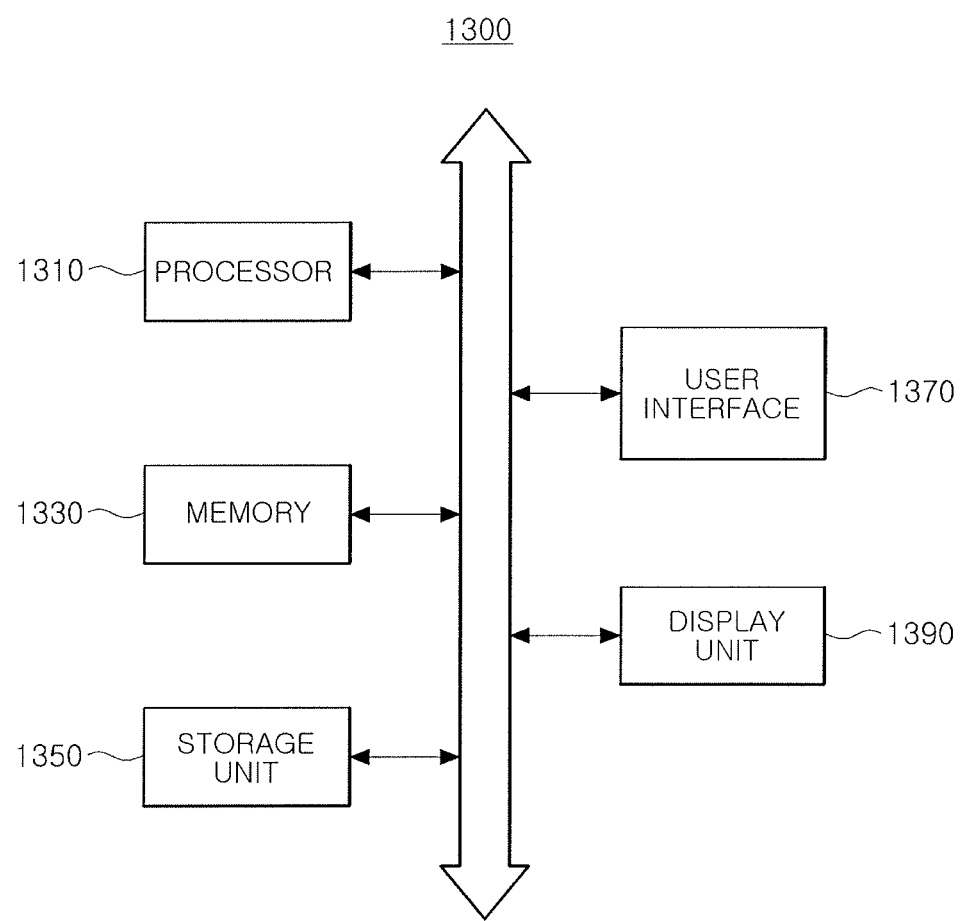
FIG. 13 illustrates a computing system performing a method for generating an aging model of a semiconductor chip according to example embodiments.

FIG. 13 is a block diagram illustrating a computing system performing a method for generating an aging model of a semiconductor chip according to example embodiments. Referring to FIG. 13, a computing system 1300 may include a processor 1310, a memory 1330, a storage unit 1350, a user interface 1370, and a display unit 1390.

The processor 1310 controls an overall operation of the computing system 1300, and may process or execute programs and/or data, stored in the memory 1330. For example, the processor 1310 may execute the STA module, thereby generating an aging model of a semiconductor chip and performing static timing analysis of a semiconductor chip.

The processor 1310 may be implemented by hardware, software, and a combination thereof, and may include a controller, a microprocessor, or the like.

The memory 1330 may store various program codes and data for generating an aging model of a semiconductor chip and performing static timing analysis. For example, the memory 1330 may store an aging modeling module or STA module, implemented with a program code. The memory 1330 may include a non-volatile memory, a volatile memory, or the like.

The storage unit 1350 may store various program codes and data for performing a method for generating an aging model according to example embodiments. For example, the storage unit 1350 may store a netlist or a plurality of aging scenarios, of a semiconductor chip. The program code, stored in the storage unit 1350, is loaded into the memory 1330 to be executed by the processor 1310, and the execution result thereof may be output through the display unit 1390. The storage unit 1350 may include a hard disc drive (HDD), a solid state drive (SSD), or the like.

The user interface 1370 may include various input devices such as a button, a keypad, a touch screen, and the like. A user of an aging modeling system according to example embodiments may input and output various data (for example: an aging scenario of a semiconductor chip, or the like) required for generation of an aging model, through the user interface 1370.

The display unit 1390 may output various result values of an aging modeling process under the control of the processor 1310. For example, the display unit 1390 may output aging information (for example: a threshold voltage variation, or the like) of a semiconductor chip, generated from a plurality of aging scenarios. The display unit 1390 may include a display device such as an LCD, OLED display, or the like.

As described above, the method for generating an aging model of a semiconductor chip according to example embodiments may be performed by the computing system, such as an example of FIG. 13. In addition, the method for generating an aging model of a semiconductor chip may be used for performing static timing analysis of various semiconductor chips, and may be used to design a semiconductor chip based on the analysis result. For example, the method for generating an aging model of a semiconductor chip may be used to design various semiconductor chips included in an electronic control unit (ECU) of a vehicle or a server.

By way of summation and review, according to one or more embodiments, an aging model for a semiconductor chip may be generated using a global aging parameter (first aging parameter) and an individual aging parameter (second aging parameter) for each semiconductor element on the semiconductor chip. According to one or more embodiments, an aging model may be generated using an instant aging parameter (third aging parameter) for each semiconductor element on the semiconductor chip. According to one or more embodiments, an aging model may be generated using a product of the individual aging parameter and the instant aging parameter. According to one or more embodiments, an aging model may be generated using a summation of a product of the individual aging parameter and the instant aging parameter chip. According to one or more embodiments, an aging model may be generated a summation of a product of the individual aging parameter and the instant aging parameter chip may be used to determine whether a semiconductor chip violates timing constraints.

As set forth above, according to example embodiments, the method for generating an aging model of a semiconductor chip is capable of significantly reducing the number of aging parameters required for generation of an aging model of a semiconductor chip or semiconductor elements forming the semiconductor chip, thereby reducing modeling costs and complexity.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method for generating an aging model, used in design of a semiconductor chip that includes a plurality of semiconductor elements, the method comprising:
    extracting a plurality of aging scenarios including a use condition of the semiconductor chip from an aging model library of the semiconductor chip;
    calculating a first aging parameter commonly applied to each semiconductor element of the plurality of semiconductor elements from the plurality of aging scenarios, wherein the first aging parameter has a same value for each semiconductor element of the plurality of semiconductor elements; and
    generating characteristic deterioration information due to aging of each of the semiconductor elements through simulation using the first aging parameter and a second aging parameter, wherein a value of the second aging parameter corresponds to an individual semiconductor element of the plurality of semiconductor elements.

2. The method as claimed in claim 1, wherein each of the plurality of aging scenarios includes bias information and usage time information of the semiconductor chip.

3. The method as claimed in claim 1, wherein the first aging parameter includes stress time information affecting characteristic deterioration of the semiconductor chip.

4. The method as claimed in claim 1, wherein calculating the first aging parameter includes:
    acquiring at least one aging information from the plurality of aging scenarios; and
    calculating the first aging parameter using the acquired aging information and a reference aging scenario stored in the aging model library.

5. The method as claimed in claim 1, wherein the second aging parameter includes a probability in which each of the semiconductor elements is under stress conditions during use of the semiconductor chip.

6. The method as claimed in claim 1, wherein the simulation is performed separately for each of the semiconductor elements under a preset reference operating voltage and reference operating temperature.

7. The method as claimed in claim 1, wherein the characteristic deterioration information includes a threshold voltage variation of each of the semiconductor elements.

8. The method as claimed in claim 1, further comprising: generating an aging model of each of the semiconductor elements, based on correlation among the first aging parameter and the second aging parameter, and the characteristic deterioration information.

9. The method as claimed in claim 8, wherein the aging model is a machine learning model trained using the first aging parameter and the second aging parameter, and the characteristic deterioration information.

10. A method for generating an aging model, used in design of a semiconductor chip that includes a plurality of semiconductor elements, the method comprising:
    calculating a first aging parameter of the semiconductor chip from a plurality of use conditions defined in an aging model library of the semiconductor chip;
    generating characteristic deterioration information due to aging of each semiconductor element of the plurality of semiconductor elements included in the semiconductor chip using the first aging parameter and a second aging parameter; and generating timing information due to aging of the semiconductor chip using the characteristic deterioration information and a third aging parameter of each semiconductor element of the plurality of semiconductor elements, wherein:

the first aging parameter has a same value for each semiconductor element of the plurality of semiconductor elements, and a value of the second aging parameter corresponds to an individual semiconductor element of the plurality of semiconductor elements.

11. The method as claimed in claim 10, wherein the first aging parameter is calculated by projecting merged aging information into a value under a preset reference use condition, after aging information of the semiconductor chip obtained from the plurality of use conditions is merged.

12. The method as claimed in claim 10, wherein the first aging parameter includes stress time information affecting characteristic deterioration of the semiconductor chip.

13. The method as claimed in claim 10, wherein the second aging parameter includes a probability in which each of the semiconductor elements is under stress conditions during use of the semiconductor chip.

14. The method as claimed in claim 10, wherein the third aging parameter includes slew information, an output load value, and sensitivity information on timing delay change, of each of the semiconductor elements.

15. The method as claimed in claim 14, wherein the sensitivity information is calculated in a liberty variation format (LVF) characterization process of the semiconductor chip.

16. The method as claimed in claim 10, further comprising: generating an aging model of the semiconductor chip, based on correlation among the first to third aging parameters, and the timing information.

17. The method as claimed in claim 16, wherein the aging model is a machine learning model trained using the first to third aging parameters and the timing information.

18. A method for manufacturing a semiconductor chip, the method comprising:

loading a plurality of aging scenarios from an aging model library of a semiconductor chip including a plurality of semiconductor elements;

acquiring a global aging parameter commonly applied to the semiconductor elements from the plurality of aging scenarios, wherein the global aging parameter has a same value for each semiconductor element of the plurality of semiconductor elements;

calculating one or more first timing delays of the semiconductor chip using the global aging parameter;

calculating a second timing delay of the semiconductor chip by summing the first timing delays;

determining whether the semiconductor chip violates timing constraints using the second timing delay; and manufacturing the semiconductor chip when the semiconductor chip does not violate the timing constraint.

19. The method as claimed in claim 18, wherein the global aging parameter includes stress time information affecting characteristic deterioration of the semiconductor chip.

20. The method as claimed in claim 18, wherein the first timing delay is calculated using characteristic deterioration information and timing delay sensitivity information of each of the semiconductor elements.

* * * * *